United States Patent [19]

Koda et al.

[11] 4,184,911
[45] Jan. 22, 1980

[54] PROCESS FOR PRODUCING POWDERY POLYCARBONATE FROM A POLYCARBONATE SOLUTION

[75] Inventors: Hiroyuki Koda; Kunio Hamaya; Hiroyuki Yoshizaki, all of Toyonaka; Yutaka Kojima, Osaka; Shiro Tsuchiya, Nara; Shinichi Fukuda, Nishinomiya; Takashi Ikeno, Takatsuki, all of Japan

[73] Assignees: Mitsubishi Gas Chemical Company, Tokyo; Hitachi Shipbuilding & Eng. Co., Ltd., Osaka, both of Japan

[21] Appl. No.: 913,315

[22] Filed: Jun. 7, 1978

[30] Foreign Application Priority Data

Jun. 13, 1977 [JP] Japan .................... 52-68860
Jun. 14, 1977 [JP] Japan .................... 52-70650
Jun. 14, 1977 [JP] Japan .................... 52-78042[U]

[51] Int. Cl.$^2$ ............................................. B01D 1/24
[52] U.S. Cl. ........................... 159/47 R; 159/6 WH; 159/2 E; 528/501; 159/DIG. 10
[58] Field of Search ............... 528/499, 501, 502; 159/2 E, 6 WH, 47, DIG. 10

[56] References Cited

U.S. PATENT DOCUMENTS

| | | | |
|---|---|---|---|
| 3,332,855 | 7/1967 | Watt | 159/6 WH |
| 3,499,878 | 3/1970 | Wood | 528/502 |
| 3,741,272 | 6/1973 | Ullrich et al. | 159/2 E |
| 3,799,234 | 3/1974 | Skidmore | 528/502 |
| 3,874,090 | 4/1975 | McCracken | 159/6 WH |

FOREIGN PATENT DOCUMENTS 51-41048 6/1976 Japan .................... 159/6 WH

*Primary Examiner*—Norman Yudkoff
*Attorney, Agent, or Firm*—Frishauf, Holtz, Goodman & Woodward

[57] ABSTRACT

A process is disclosed for producing powdery polycarbonate from a polycarbonate solution which comprises:

(a) charging the solution into the feed opening of a disolvating apparatus, the apparatus being composed of a casing and having at least two screws incorporated therein, the screws meshing with each other; the apparatus comprising two parts; a evaporating zone and a powdering zone; a space being provided above the screws in the evaporating zone, the space extending in the axial direction of the screws and having at least one degassing opening, and side and bottom portions of screws generally fitting with the casing in the evaporating zone; top, side and bottom portions of screws generally fitting with the casing in the powdering zone, heating means being installed in the casing and/or screws;

(b) in the evaporating zone, evaporating the solvent of the polycarbonate solution using the heating means while moving the solution by the screws;

(c) powdering the dried polycarbonate in the powdering zone; and (d) discharging the powdery polycarbonate from the product exit in the powdering zone.

9 Claims, 7 Drawing Figures

PROCESS FOR PRODUCING POWDERY POLYCARBONATE FROM A POLYCARBONATE SOLUTION

BACKGROUND OF THE INVENTION

This invention relates to a process for producing powdery polycarbonate from a polycarbonate solution.

Numerous attempts have been made to obtain powdery polycarbonate from a polycarbonate solution. For example, there is a process which comprises charging a polycarbonate solution into a cylindrical casing in having one or two cooperating screws engaging each other, evaporating the solvent present in the solution while the solution is moved through the casing by the screws to obtain melt polycarbonate. However, in this process, when the solvent is blown out from the solvent exit of the casing, some of the polycarbonate solution is entrained with the solvent vapor, and this causes clogging of the solvent exit. Even when many exits are installed in the longitudinal direction of the casing, most of the exits become partially or completely clogged. This increases the internal pressure of the casing whereby the polycarbonate solution is caused to back-flow into the feed opening for the solution.

In order to overcome this shortcoming, a process for obtaining polycarbonate in a powdery state has been proposed. For example, Japanese Patent Publication (laid open) No. 41048/1976 discloses a process in which a desolvating apparatus is used, having two screws with particular helical blades, the screws being arranged to rotate inward. The evaporating zone is the space between the inner wall of the cylindrical container and the upper portion of the screws as shown in the drawings of the above Publication. Since the apparatus is provided with an evaporating zone, clogging of the solvent exits is eliminated. However, in this process, the solid polycarbonate is deposited on the inner side wall from which the periphery of screws begin to depart. In addition, since a progressive blade and retrogressive blade are used, the efficiency of the desolvating apparatus is lowered. As a result, much solid polycarbonate accumulates on the wall of the apparatus. Therefore, the concentration gradient of the polycarbonate solution from the feed opening for the solution to the exit for the product becomes non-uniform, and eventually polycarbonate solution which is not sufficiently concentrated is discharged from the product exit.

BRIEF EXPLANATION OF THE DRAWINGS

FIG. 1 is a cross sectional view of the apparatus;

FIG. 2 is a cross sectional view taken along section line II—II of FIG. 1;

FIG. 3 is a cross sectional view for showing another embodiment of a cooling line;

FIG. 4 is a cross sectional view taken along section line IV—IV of FIG. 1;

FIG. 5 is a cross sectional view of the apparatus;

FIG. 6 is an enlarged longitudinal cross sectional view of the pressing means; and FIG. 7 is an enlarged transversal cross sectional view of the means.

SUMMARY OF THE INVENTION

Figure 1:
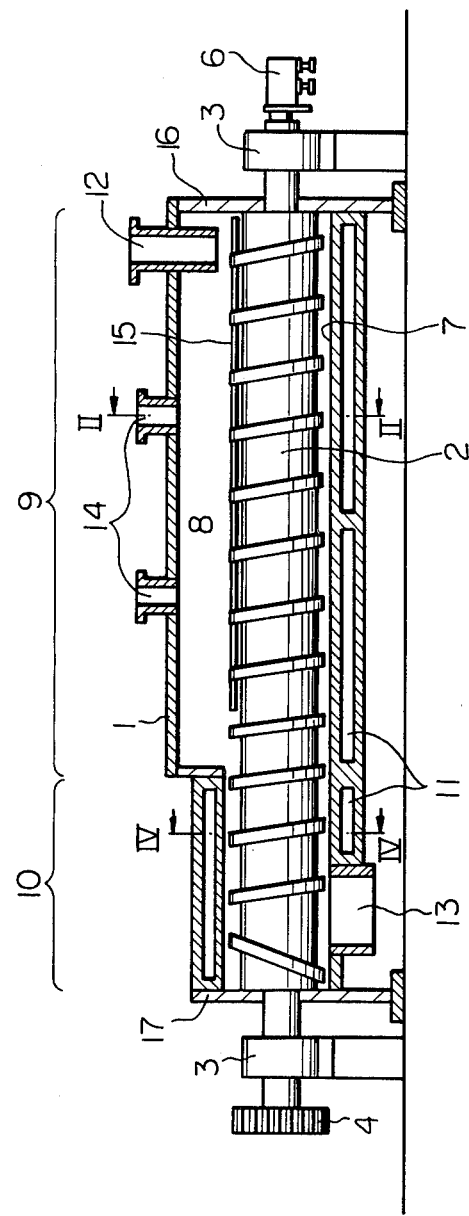
FIGS. 1-4 show one embodiment of an apparatus for carrying out the present process.

We have discovered a process to obtain powdery polycarbonate from a polycarbonate solution, for producing powdery polycarbonate from a polycarbonate solution without using a particular screw.

Therefore, an object of this invention is to provide a process for producing powdery polycarbonate from a polycarbonate solution in which a large amount of the polycarbonate solution can be treated per unit time.

Another object of this invention is to provide a process for producing powdery polycarbonate from a polycarbonate solution in which the polycarbonate solid does not accumulate on the wall of the desolvating apparatus.

This invention relates to a process for producing powdery polycarbonate from a polycarbonate solution which comprises:

(a) charging the solution into the feed opening of a desolvating apparatus, the apparatus being constituted of a casing and having at least two screws incorporated therein, the screws meshing with each other, the apparatus comprising two parts, an evaporating zone and a powdering zone, a space being provided above the screws in the evaporating zone, the space extending in the axial direction of screws and having at least one degassing opening, and side and bottom portions of screws generally fitting with the casing in the evaporating zone; top, side and bottom portions of screws generally fitting with the casing in the powdering zone, heating means being installed in the casing and/or the screws, cooling lines being longitudinally located on the inner side wall of the casing where the periphery of the screws begins to depart from the inner side wall, (b) in the evaporating zone, evaporating the solvent of the polycarbonate solution using the heating means while progressively moving the solution by the screws, and at the same time condensing a portion of the vaporized solvent by the cooling lines, (c) powdering the dried polycarbonate in the powdering zone, and (d) discharging the powdery polycarbonate from the product exit in the powdering zone.

In place of locating the cooling line on the inner side wall of the casing, the vaporized solvent may be condensed outside the casing and then the condensed solvent may be fed into the inner side wall of the casing where the periphery of the screws begins to depart from the inner side wall.

In addition to installing the cooling line in the casing, or feeding condensed solvent into the inner wall, pressing means may be installed at the end of the evaporating zone near the powdering zone. The pressing means intermittently presses the polycarbonate solid accumulated in the evaporating zone against the screw threads.

DETAILED DESCRIPTION OF THE INVENTION

This invention is further illustrated by non-limiting drawings. Casing 1 is provided with two screws 2 over the length of the casing 1. The threads of the screws mesh with each other. Both ends of the two screws are supported by supporting means 3 and are rotated by driving gear 4 powered by a motor (not shown). The direction of rotation of the screws is selected so that the phase of the screws proceeds from right side to left side in the drawing. Two screws are shown in the drawing, but, three or more screws may be used. Screws 2 are provided with a passage 5 for conducting heating fluid in the axial direction. Hot water, steam or another hot medium is fed into passage 5 through rotary joint 6 connected to one end of the screws. Casing 1 has a bottom wall 7 of twin cylinder shape. Casing 1 consists of evaporating zone 9 and powdering zone 10. Evaporating zone 9 constitutes space 8 which is provided above the screws, extends from the upstream end 16 of the flow of the polycarbonate solution and ends short of the downstream 17 thereof. Side and bottom portions of the screws generally closely fit with the bottom wall of twin cylinder shape of casing 1 in evaporating zone 9.

Top, side and bottom portions of the screws generally fit closely with casing 1 throughout the powdering zone 10. Casing 1 is provided with heating jacket 11 in the bottom and side walls of the evaporating zone 9 and in the wall of the powdering zone 10. The heating fluid is passed through heating jacket 11. The end of the evaporating zone 9 in casing 1 is provided with feed opening 12 for the polycarbonate solution. The end of the powdering zone in casing 1 is provided with product exit 13 for purging the product. The upper wall of the evaporating zone is provided with one or more degassing openings 14 for the solvent vapor. Degassing openings 14 may be connected to a suction pump, such as vacuum pump (not shown) through a desolvating line (not shown). Cooling lines 15 are positioned lengthwise and are located on the inner side wall of casing 1 where the periphery of screws begin to depart from the inner side wall. A portion of the solvent vapor is condensed on cooling lines 15. The polycarbonate solution to be dried is fed into casing 1 through feeds opening, so the screws are submerged in the solution. Cooling medium such as water at an appropriate temperature is circulated in cooling lines 15. Polycarbonate solid is likely to adhere to or be deposited on the inner side wall of casing 1 where the periphery of screws begin to depart from the inner side wall. As solvent in the polycarbonate solution can dissolve the polycarbonate solid, the solvent condensed at cooling lines 15 prevents the polycarbonate solid from adhering to or being deposited on the inner side wall of casing 1.

Figure 2:
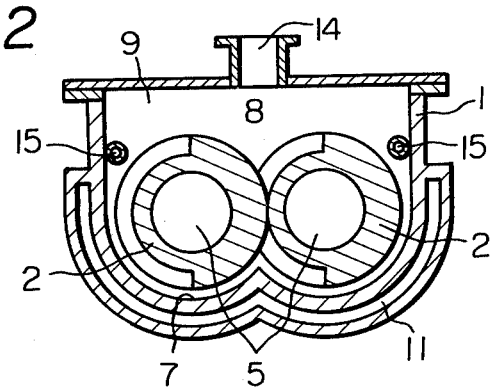
Figure 3:
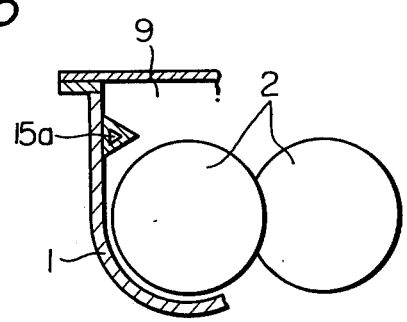
Figure 4:
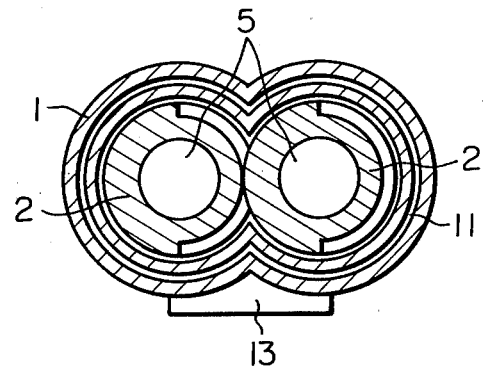

The cross section of the lines 15 may be circular as shown in FIG. 2 or may be triangular (cooling lines 15a) as shown in FIG. 3.

As a modification of the cooling lines, casing 1 may be divided into two parts; one part being generally fitted with screws 2 and the other part constituting space 8, and the latter part may be used as jacket, through which cooling medium is passed.

As occasion demands, vapor of the solvent evaporated from the polycarbonate solution may be liquefied by a condenser (not shown) which is outside the casing, and then the liquefied solvent may be fed into the inner wall where the periphery of screws begins to depart from the inner side wall.

In the case of condensing the solvent vapor followed by feeding the condensate into the inner wall of casing, fresh solvent may be charged into the side wall of casing 1 at the point from which the periphery of screws begins to depart from the inner side wall. This embodiment is based on the same technical idea as that of condensing vapor of solvent evaporated from the polycarbonate solution by cooling lines 15.

Figure 5:
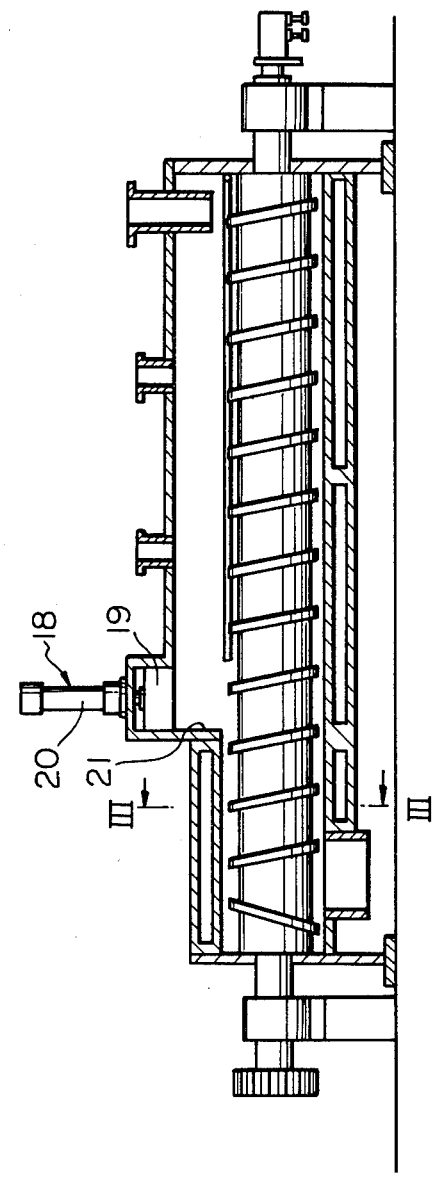
FIGS. 5-7 show another embodiment of an apparatus for carrying out the present process.
Figure 6:
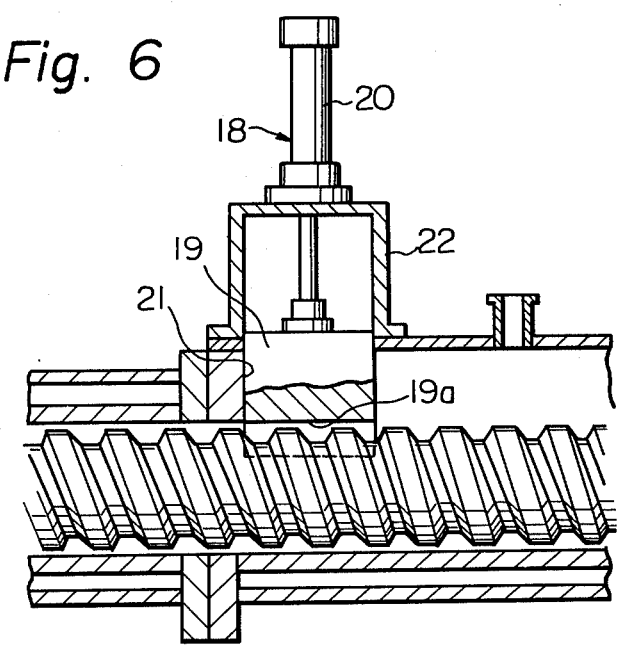
Figure 7:
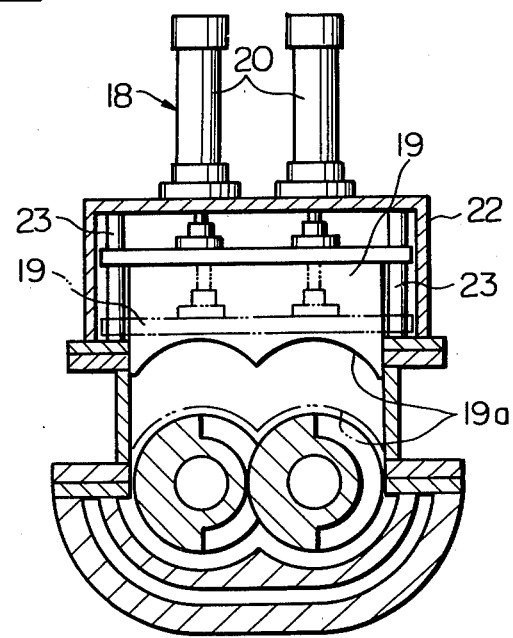

In addition to installing cooling lines 15 in casing 1 or feeding condensed solvent into the inner wall of the casing 1, pressing means may be installed in casing 1 as shown in FIGS. 5–7, where pressing means 18 is installed at end of the evaporating zone 9 near the powdering zone. Pressing means 18 comprises a pair of cylinders 20 operated by oil pressure or air pressure and pressing block 19 mounted on piston rod of cylinders 20. Cylinders 20 are installed on lid means 22 of casing 1. When pressing block 19 goes down, lower surface 19a of pressing block 19 approaches near the screw threads but does not contact the threads. Both sides of pressing block 19 fit with guiding bars 23 mounted on casing 1. Pressing block 19 goes up and down.

The polycarbonate to be treated in this invention is a commercially available polymer, for example, a reaction product obtained by reacting a bis-phenol, such as bis(4-hydroxyphenyl)alkane, bis(4-hydroxyphenyl) sulfone, bis(4-hydroxyphenyl) ether or a substituent in which halogen or alkyl is substituted on the benzene ring thereof with phosgene in the presence of a base, namely a reaction product of the known phosgene method or pyridine method for producing the polycarbonate. The polycarbonate may be a homopolymer or a copolymer derived from a bis-phenol. Examples of organic solvents for the polycarbonate include chlorinated aliphatic hydrocarbons, such as methylene chloride, chloroform and ethylene chloride, and pyridine. The polycarbonate may be dissolved in a solvent so that the concentration of solution amounts to 10 to 40% by weight. As occasion demands, benzene, chlorobenzene, toluene or the like may be mixed with the polycarbon solution. The amount of the aromatic hydrocarbon added to the polycarbonate solution is not critical. It is meaningless to add too much aromatic hydrocarbon to the solution. The amount of aromatic hydrocarbon added may be equal to the amount of the polycarbonate solution. The addition of an aromatic hydrocarbon makes the powdering of the polycarbonate easy.

According to the present invention, a polycarbonate solution is concentrated, and a powdery polycarbonate is obtained.

A step of drying the polycarbonate solution is explained in detail by the following description: A polycarbonate solution is fed into casing 1 from feed opening 12. The solution is moved from the upstream flow of the solution to the downstream flow thereof by screws 2. During this period, casing 1 and screws 2 are heated by passing hot fluid through passage 5 and heating jacket 11. The solvent present in the solution is heated in evaporating zone 9; and a large amount of solvent vapor is generated therein. The solution is heated so that the temperature of the solution becomes higher than the boiling point of the solvent. It is unpreferable to heat the solution the melting point temperature of the polycarbonate. The generated vapor is sucked through degassing openings 14 for solvent by a suction pump. The pressure of evaporating zone 9 may be one atmospheric pressure or a reduced pressure of as low as 500 mm vacuum. Since evaporating zone 9 is installed in casing 1 and has a space which is expanded in the axial direction, the polycarbonate solution is not entrained with the solvent vapor from degassing openings 14, and bumping of the solution does not occur. Therefore, the degassing openings are not clogged, and furthermore, the inner pressure of casing 1 does not increase, so the polycarbonate solution does not backflow into feed opening 12 for the solution. Therefore, transporting ability of the solution is not lowered.

Most of the solvent is evaporated in evaporating zone 9, so the material to be treated turns solid at the end of evaporating zone. The concentrated polycarbonate solid is often baked at heating jacket 11 by heating, and is deposited onto the inner wall of casing 1. The deposit can not be removed by screws 2. This problem can be solved by condensing a portion of solvent vapor on the inner side wall of casing 1. For example, when lines 15 for cooling medium are installed in casing 1, solvent vapor is condensed on the surface of lines 15. The condensed solvent dissolves the deposited polycarbonate solid, whereby the polycarbonate solid deposited onto the wall of casing is transported into powdering zone 10.

In the embodiment as shown in FIGS. 5-7, as the gelation of polycarbonate proceeds, some of the gelled polycarbonate solid is separated from the screws. The polycarbonate solid grows to a large mass in evaporating zone 9. When the mass becomes larger than the pitch interval of the screw thread, it runs on the screw threads without being crushed by the screws. The polycarbonate mass on the screw threads gradually proceeds to and accumulates at the end 21 of evaporating zone 9 near powdering zone 10. Finally, evaporating zone 9 is clogged.

However, pressing means 18 intermittently presses down the polycarbonate solid so accumulated on the screw threads by driving pressing block 19 down. Therefore, even when the step of drying the polycarbonate solution is continued for a long time, the evaporating zone is not clogged.

The polycarbonate is powdered in powdering zone 10 by two screws meshing with each other. The powdery polycarbonate is discharged from product exit 13.

According to the present invention, powdery polycarbonate with a concentration above 60% by weight, usually with a concentration of from 70 to 95% by weight can be obtained from product exit 13 by an appropriate combination of the kind of solvent, the heat transfer area, amount of polycarbonate solution fed per unit time, the concentration of polycarbonate solution and rotational rate of the screws. Therefore, the powdery polycarbonate can be fed into an extruder without need for further drying of the powder, whereby polycarbonate pellets and molded product can be obtained from the polycarbonate powder.

The present process can be continuously carried out with a single apparatus. As occasion demands, the powdering zone may be extended, whereby pelletizing of the polycarbonate powder can be carried out simultaneously.

The present invention is further illustrated by the following Examples and Comparative Examples. However, this invention should not be limited by these Examples and Comparative Examples. The percentages and parts in the Examples are based on weight unless otherwise specified.

EXAMPLE 1

The polycarbonate having an average molecular weight of 25000 obtained from bisphenol A by a phosgene method was used. A 20% solution of the polycarbonate in methylene chloride was fed into the following desolvating apparatus to obtain powdery polycarbonate. The apparatus has the structure shown in FIG. 1. That is, the apparatus (L/D=18) comprising a casing and two screws (external diameter=98 mm and rotating outward) meshing with each other throughout the length of the casing. The portion having L/D=12 corresponds to evaporating zone and the portion having L/D=6 corresponds to powdering zone. A line having external diameter of 10 mm was installed on the inner wall of casing at the point from which the periphery of the screws begin to depart. Cooling water was passed through the line. The temperature of cooling water at exit of the line is maintained at 40° C. Steam with a pressure of from 2 to 3 Kg/cm² Gauge was passed through passage 5 and heating jacket 11.

The rate of rotation of the screws was 15 r.p.m. The amount of polycarbonate solution fed was 84 Kg/hr. The pressure of the evaporating zone was reduced by from 100 to 200 mm Head of Water. Powdery polycarbonate was obtained from product exit 13. The solvent content in the powder was 19%. Deposition of the polycarbonate solid onto the inner wall of the casing, bumping of the polycarbonate solution and blowing-up of the polycarbonate solid was not observed. So, continuous operation could be stably carried out.

Even when the amount of the polycarbonate solution fed was changed to a range of from 75 Kg/hr. to 95 Kg/hr., neither the properties of the product nor operating conditions were changed.

EXAMPLE 2

The starting material obtained by adding 1.5 parts by volume of toluene to 8 parts by volume of the polycarbonate solution employed in Example 1 was desolvated using the apparatus of Example 1.

When the starting material was fed into the apparatus at rate of 102 Kg/hr., a polycarbonate powder which was finer than the polycarbonate powder obtained in Example 1 was obtained. The solvent content in the powder was 12%. Deposition of the polycarbonate onto the inner wall of the casing was not observed.

The polycarbonate powder so obtained was fed into a vented extruder having a diameter of 40 mm and L/D of 27 without further treatment of the powder, and the resin was melt-extruded at a temperature within the range of from 270° to 280° C. to obtain polycarbonate pellets. The resulting pellets were not discolored and compared favorably with commercially available polycarbonate pellets.

EXAMPLE 3

The procedure of Example 2 was repeated except that the two screws rotated in the same direction and the feeding rate of the starting material was 94 Kg/hr. A finer polycarbonate powder was obtained. The solvent content in the powder was 20%. There was no trouble in the evaporating zone, and continuous operation could be carried out.

Comparative Example 1

The procedure of Example 1 was repeated except that an apparatus having round shaped vent and not having evaporating zone was employed. Part of the vent and part of feed opening were clogged by the solution, solvent vapor backflowed into the feed opening.

When the feeding rate of the polycarbonate solution was reduced to 50 Kg/hr, clogging of the feed opening stopped, but the polycarbonate solid was entrained from the vent with the solvent vapor, so continuous operation could not be stably carried out.

Comparative Example 2

The procedure of Example 2 was repeated except that an apparatus not having lines 15 was employed. The resin was baked and deposited onto the inner wall of the casing, which could not be contacted by the screw threads. The resin was gelled and accumulated on the wall. Sometimes, a mass of the resin was released from the wall and was transported to the downstream flow of the solution by the screws. Finally, the mass which was not crushed with the screw threads accumulated at the end of evaporating zone near the powdering zone, so the evaporating zone was filled with the resin. It became impossible to continue the operation.

What is claimed is:

1. A process for producing powdery polycarbonate from a polycarbonate solution in a powdering apparatus which comprises: a casing having an enlongated hollow bore therein; an evaporating zone and a powdering zone extending axially in said bore; at least two rotatable intermeshing screws in said bore, said at least two screws extending from said evaporating zone to said powdering zone; a feed inlet in communication with said evaporating zone; a product outlet in communication with said powdering zone; said evaporating zone comprising an evaporation space in said bore above said at least two screws in said evaporating zone, said evaporating zone being provided with at least one degassing opening connecting said hollow bore to the outside of said casing; the side and bottom portions of said screws generally fitting with said casing in said evaporating zone; and the top, side and bottom portions of said screws generally fitting with said casing in said powdering zone; the process comprising:
    (a) charging the polycarbonate solution into said feed inlet;
    (b) rotating said screws so that the intermeshing threads thereof propel said solution toward said product outlet;
    (c) heating said polycarbonate solution at least in said evaporating zone for evaporating the solvent of said polycarbonate solution, while rotating said screws, to dry said polycarbonate solution;
    (d) cooling at least a portion of the evaporated solvent in said evaporation space to condense at least a portion of the evaporated solvent, and applying said condensed solvent on the inner side walls of said casing in close proximity to the area where the periphery of said screws begins to depart from the inner side wall of said casing in said evaporating zone, to prevent polycarbonate solid from adhering to or being deposited on said inner side walls in said evaporating zone, and if any solid polycarbonate is deposited on said inner side walls in said evaporating zone, to dissolve deposited solid polycarbonate;
    (e) powdering the dried polycarbonate in said powdering zone; and
    (f) discharging the powdered polycarbonate from said powdering zone via said product outlet.

2. The process of claim 1, wherein said cooling step comprises condensing at least a portion of the evaporated solvent on the inner side walls of said casing in close proximity to the area where said periphery of said screws begins to depart from the inner side wall of said casing in said evaporating zone.

3. The process of either of claims 1 or 2, wherein said cooling step comprises passing a cooling medium through at least one cooling line mounted on the inner side wall of said casing, parallel to the longitudinal axis of said screws, said at least one cooling line being mounted to said inner side wall of said casing in close proximity to the area where the periphery of said screws begins to depart from the inner side wall of said casing in said evaporating zone, the evaporated solvent being condensed at least on the outer walls of said at least one cooling line.

4. The process of claim 3, wherein said at least one cooling line is located between the uppermost portion of at least one of said screws and the adjacent inner side wall of said casing, in said evaporation zone.

5. The process of claim 1 wherein said condensed solvent is applied above the point where the periphery of said screws begins to depart from the inner side wall of said casing in said evaporating zone.

6. A process for producing powdery polycarbonate from a polycarbonate solution in a powdering apparatus which comprises: a casing having an elongated hollow bore therein; an evaporating zone and a powdering zone extending axially in said bore; at least two rotatable intermeshing screws in said bore, said at least two screws extending from said evaporating zone to said powdering zone; a feed inlet in communication with said evaporating zone; a product outlet in communication with said powdering zone; said evaporating zone comprising an evaporation space in said bore above said at least two screws in said evaporating zone, said evaporating zone being provided with at least one degassing opening connecting said hollow bore to the outside of said casing; the side and bottom portions of said screws generally fitting with said casing in said evaporating zone; and the top, side and bottom portions of said screws generally fitting with said casing in said powdering zone; the process comprising:
    (a) charging the polycarbonate solution into said feed inlet;
    (b) rotating said screws so that the intermeshing threads thereof propel said solution toward said product outlet;
    (c) heating said polycarbonate solution at least in said evaporating zone for evaporating the solvent of said polycarbonate solution, while rotating said screws, to dry said polycarbonate solution;
    (d) condensing at least a portion of the evaporated solvent outside of said casing;
    (e) feeding said condensed solvent onto the inner side walls of said casing in said evaporating zone in close proximity to the area where the periphery of said screws begins to depart from the inner side wall of said casing to prevent polycarbonate solid from adhering to or being deposited on said inner side walls in said evaporating zone, and if any solid polycarbonate is deposited on said inner side walls in said evaporating zone, to dissolve deposited solid polycarbonate;
    (f) powdering the dried polycarbonate in said powdering zone; and
    (g) discharging the powdered polycarbonate from said powdering zone via said product outlet.

7. The process of claim 1 or 6, further comprising intermittently pressing down the polycarbonate solid accumulated in the evaporation zone between the screw threads of said at least two screws with a pressing means positioned in the evaporating zone near the powdering zone.

8. The process of claim 6 wherein fresh solvent is added to said condensed solvent, said fresh and condensed solvent being fed onto said inner side walls of said casing in said evaporating zone in close proximity to the area where the periphery of said screws begins to depart from the inner side wall of said casing.

9. The process of claim 6 wherein said condensed solvent is fed onto the inner side walls of said casing in said evaporating zone above the point where the periphery of said screws begins to depart from the inner side wall of said casing.

* * * * *